Oct. 26, 1943. J. D. INFIELD 2,332,723
HOSIERY FIT TESTERS
Original Filed April 22, 1942
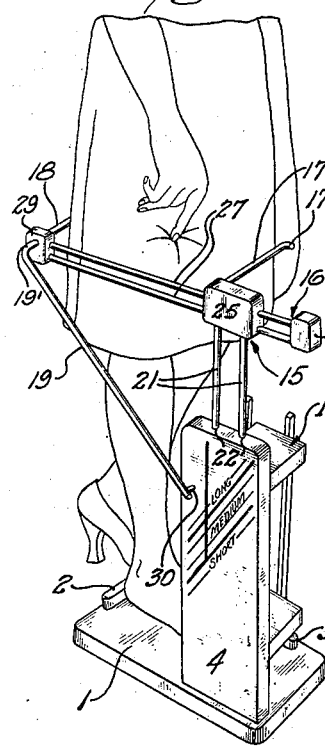
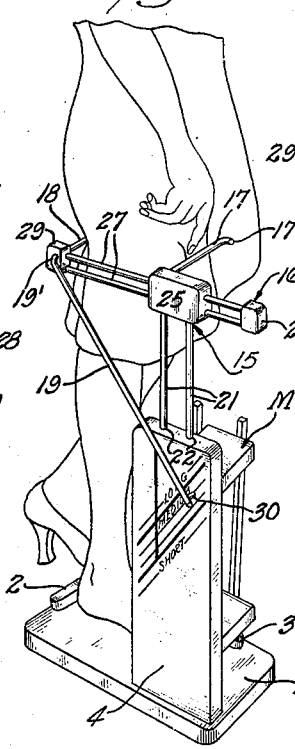
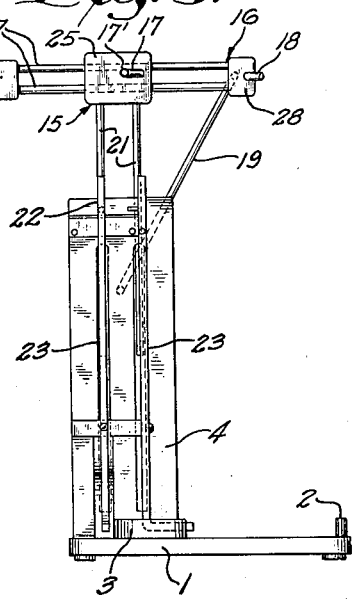
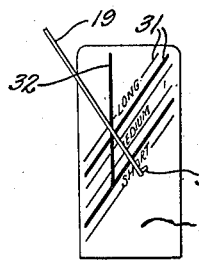
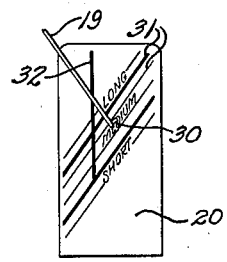
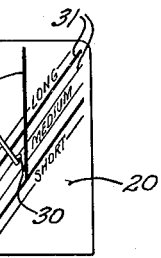
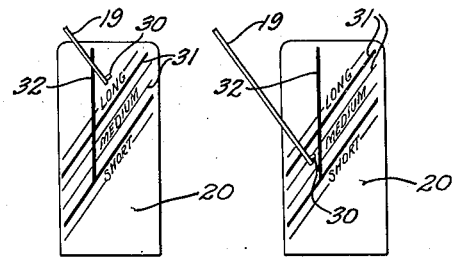
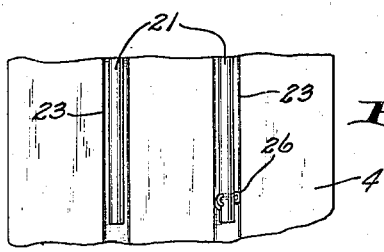
INVENTOR.
JOHN D. INFIELD.
BY
ATTORNEYS.

Patented Oct. 26, 1943

2,332,723

UNITED STATES PATENT OFFICE 2,332,723

HOSIERY-FIT TESTER

John D. Infield, Milwaukee, Wis., assignor to Holeproof Hosiery Co., Milwaukee, Wis., a corporation of Wisconsin Original application April 22, 1942, Serial No. 440,041. Divided and this application November 16, 1942, Serial No. 465,710

5 Claims. (Cl. 33—2)

This invention relates to a hosiery-fit tester designed and adapted to facilitate the accurate determination of leg length and proportion so that the purchaser of hosiery will receive the right size and a correct fit.

The present invention is a division of my application for "Hosiery fit tester," filed April 22, 1942, Serial No. 440,041.

An object of the invention is to provide a hosiery-fit tester possessed of these capabilities, and which is simple and compact in construction, convenient and comfortable to use, and readily and quickly adjusted to effect the required measurement and thereby determine the leg length and proportion.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1 is a perspective view illustrating a complete hosiery-fit tester embodying the present invention and showing the same in the first adjustment involved in measuring leg length and proportion;

Figure 2 is a view similar to Figure 1 illustrating the final adjustment involved in measuring leg length and proportion;

Figure 3 is a view in side elevation of the complete hosiery fit tester;

Figure 4 is a fragmentary view similar to Figure 5 but on a larger scale to illustrate the friction device for retaining the carrier of the leg length and proportion measuring device in vertical adjustment; and Figures 5, 6, 7, and 8 are views in elevation of the leg length and proportion measuring chart, a portion of its cooperable pointer or indicator being illustrated and being shown in the various positions which it assumes in measuring different leg lengths and proportions.

Referring to the drawing it will be seen that the hosiery-fit tester embodying the present invention comprises a platform 1 which is constituted of a rectangular flat plate of wood, or other suitable material, adapted to rest flatly on the floor and presenting a flat, smooth upper surface. A heel guide 2 is provided on the platform 1 and consists of a strip of wood, or other suitable material, which is suitably fixed to the platform 1 adjusted one end thereof and parallel to the edge of the end next to which it is exposed. Also fastened to the platform 1 is an outside guide 3 which is of strip-like form and is disposed at right-angles to the guide 2 and so positioned on the platform that it is engageable with one side of the ball portion of the foot placed in position on the platform as illustrated in Figures 1 and 2.

A vertical standard 4, which may be a smooth and finished board, has its lower end suitably fastened to the platform 1 at the side thereof opposite the outside guide 3. The vertical standard 4 may be braced in any suitable way to its platform 1.

The platform 1 and standard 4 have combined therewith in the actual commercial embodiment of the device means for measuring a foot for stocking size, certain of the elements of which means are shown at M in Figures 1 and 2, but as this means is fully disclosed and claimed in my application above referred to, and per se forms no part of the length proportioning device which is the subject matter of this case, it need not be described in this application.

The leg length and proportion measuring device, in addition to the elements previously described, comprises generally a vertically adjustable carrier, designated as a whole at 15, which is slidably interfitted with the standard 4. A horizontally adjustable carrier, designated as a whole at 16, is slidably interfitted with the upper end of the carrier 15. Thigh-engaging gauge bars 17 and 18 are mounted on and carried by the carriers 15 and 16, respectively. A pointer 19 is mounted on the horizontally adjustable carrier 16 and cooperates with the chart, designated generally at 20, provided on the outside face of the standard 4.

The carrier 15 may advantageously comprise a pair of parallel vertical metal rods 21 which slide through guide bearings 22 provided therefor in the upper end of the standard 4, and are also received in tracks or guide grooves 23 provided in the standard 4 below the bearings or guides 22. At their upper ends the rods 21 are interfitted with and secured to a crosspiece or metal head block 25. In order to retain the carrier 15 in any vertical adjustment, a suitable friction device is provided between at least one of the rods 21 and its track or guide groove 23. As illustrated in Figure 4, this friction device may take the form simply of a cotter pin 26, which is extended through an opening in the lower end of one of the guide rods 21 and is bent around the same so as to be fastened thereto, the head of cotter pin having friction engagement with one of the side walls of the groove or track 23. Of course, any friction shoe or suitable friction device may replace the cotter pin 26.

The cross-piece or head 25 of the vertically adjustable carrier 15 has transversely extending guide or bearing openings therein. The horizontally adjustable carrier 16 may also advantageously comprise a pair of parallel horizontally disposed metal rods 27, which slide through the bearings of the openings in the head or cross-piece 25. End blocks 28 and 29 are provided to interconnect the ends of the rods 27 of the carrier 16, the blocks 28 and 29 having openings in which the ends of the rods 27 are fitted and secured.

The gauge bar 17 consists of a metal rod fixed to the head or cross-piece 25 and extending horizontally and laterally therefrom. The end of the gauge bar 17 may be rounded, as at 17', to avoid a pointed or sharp projection. The adjustable gauge bar 18 is similar in construction to the gauge bar 17, and is carried by an end block 29 of the horizontally adjustable slide. The pointer 19 is also in the form of a metal rod which has one end laterally bent as at 19' and rigidly interconnected with the end block 29. The pointer 19 extends downwardly at an angle and its lower end is provided with a pointing pin 30 which traverses the chart 20.

The chart 20 consists of a series of sloping graduations or lines 31 and associated indicia, such as the words "long," "short," and "medium." In addition to the sloping or oblique lines 31 the chart 20 also includes a heavy black vertical line 32 disposed thereon, as illustrated in Figures 1, 2, and 5 to 8, inclusive.

With this construction, to determine the accurate leg length and proportion, the prospective purchaser of stockings places her right foot on the platform 1 with her heel engaged with the heel guide 2 and the side of the foot engaged with the outside guide 3. The purchaser then places her finger on the garter button of her right leg, as illustrated in Figure 1, and as she does this the operator of the device pulls upwardly on the vertically adjustable carrier 15 until its gauge bar 17 is in exact horizontal alinement with, or at the same vertical height as, the position of the garter button, as indicated by the purchaser's finger. The horizontal adjustable slide 16 is then slid toward the back of the customer's or purchaser's leg until it just touches the same. Both gauge bars 17 and 18 must just touch the leg, no more, no less. When this has been done, the pointer indicates on the chart 20 the correct leg length and leg proportion. For example, if the pointing pin 30 of the pointer 19 is in the position shown in Figure 5, the indication is that a short length hose is required. Figure 6 requires a medium length requirement, and Figure 7 a long length requirement. When the pointer is positioned as shown in Figure 8, the indication is medium length but also that extra elasticity is desirable. This may be satisfied by supplying the customer with a medium length hose or stocking of the type which has strain-absorbing properties in the region of the stocking above the knee.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. In a hosiery-fit tester, a leg length and proportion measuring device comprising a platform on which the foot is placed and having means for locating the foot in proper position thereon, a vertical standard secured at its lower end to said platform at the side thereof opposite to that on which the foot is placed, a vertically adjustable carrier slidably interfitted with said standard and releasably held in any vertical adjustment, a horizontal thigh-engaging gauge bar carried by the upper end of said carrier, a horizontally adjustable slide mounted on the upper end of said carrier, a cooperable horizontal thigh-engaging gauge bar carried by said slide, a chart on the outside face of said panel, and an inclined pointer carried by one end of said horizontal slide and cooperable with said chart.

2. In a hosiery-fit tester, a leg length and proportion measuring device comprising a platform on which the foot is placed and having means for locating the foot in proper position thereon, a vertical standard secured at its lower end to said platform at the side thereof opposite to that on which the foot is placed, a vertically adjustable carrier slidably interfitted with said standard and releasably held in any vertical adjustment, a horizontal thigh-engaging gauge bar carried by the upper end of said carrier, a horizontally adjustable slide mounted on the upper end of said carrier, a cooperable horizontal thigh-engaging gauge bar carried by said slide, a chart on the outside face of said panel comprising oblique parallel lines and associated indicia designating long, medium, and short stocking lengths, and an inclined pointer carried by one end of said horizontal slide and cooperable with the lines and indicia of the chart to determine the appropriate leg length of the hosiery required.

3. In a hosiery-fit tester, a leg length and proportion measuring device comprising a vertically adjustable carrier, support means therefor, a horizontally adjustable carrier slidably interfitted with the upper end of the vertically adjustable carrier, thigh-engaging bars mounted on said carriers, a pointer carried by the horizontally adjustable carrier, and a chart disposed on said support means having indicia thereon designating stocking lengths, said pointer traversing the chart and cooperating with the indicia thereof to determine the appropriate leg length of the hosiery required.

4. In a hosiery-fit tester, a leg length and proportion measuring device comprising a vertically adjustable carrier, support means therefor, a horizontally adjustable carrier slidably interfitted with the upper end of the vertically adjustable carrier, thigh-engaging bars mounted on said carriers, a pointer carried by the horizontally adjustable carrier, and a chart disposed on said support means and having a series of sloping lines thereon across which the pointer traverses, the sloping lines having associated therewith the words "long," "medium," and "short," respectively, said chart also having a vertical line with which the pointer is cooperable to designate, when the pointer is on one side of the vertical line, that a stocking wherein provision for extra elasticity is made, is required.

5. In a hosiery-fit tester, a leg length and proportion measuring device comprising a platform having means for locating the foot in proper position thereon, a vertical standard at one side of the platform, a vertically adjustable carrier slidably interfitted with the standard and releasably secured in various vertical adjustments, a horizontally adjustable carrier slidably interfitted with the upper portion of the vertically adjustable carrier, thigh-engaging bars mounted on the vertically and horizontally adjustable carriers, an inclined pointer carried by the horizontally adjustable carrier, and a chart on the outside face of the standard across which the pointer traverses, said chart having indicia thereon representing various leg lengths and proportions.

JOHN D. INFIELD.